United States Patent
Bhatia et al.

(10) Patent No.: US 9,975,460 B2
(45) Date of Patent: May 22, 2018

(54) COMPACT MECHANICAL LUMBAR VEHICLE SEATING

(71) Applicant: Toyota Motor Engineering & Manufacturing North America, Inc., Erlanger, KY (US)

(72) Inventors: Vikas Bhatia, South Lyon, MI (US); Masroor Fahim, Canton, MI (US); Peter J. Moegling, Whitmore Lake, MI (US); Brandon J. Vick, Milan, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 13 days.

(21) Appl. No.: 15/208,594

(22) Filed: Jul. 12, 2016

(65) Prior Publication Data
US 2018/0015860 A1    Jan. 18, 2018

(51) Int. Cl.
| | |
|---|---|
| *B60N 2/02* | (2006.01) |
| *B60N 2/66* | (2006.01) |
| *B60N 2/06* | (2006.01) |
| *B60N 2/46* | (2006.01) |
| *B60N 2/22* | (2006.01) |

(52) U.S. Cl.
CPC ............ *B60N 2/6673* (2015.04); *B60N 2/06* (2013.01); *B60N 2/22* (2013.01); *B60N 2/4606* (2013.01); *B60N 2/666* (2015.04)

(58) Field of Classification Search
CPC ........ B60N 2/6673; B60N 2/666; B60N 2/06; B60N 2/22; B60N 2/4606
See application file for complete search history.

(56) References Cited

U.S. PATENT DOCUMENTS

| | | | | |
|---|---|---|---|---|
| 5,567,010 | A | * | 10/1996 | Sparks .................. A47C 7/462 297/284.1 |
| 8,091,966 | B2 | | 1/2012 | Schweizer et al. |
| 8,991,923 | B2 | | 3/2015 | Maierhofer et al. |
| 9,327,767 | B2 | * | 5/2016 | Ikeda ................... B62D 21/157 |
| 9,452,692 | B1 | * | 9/2016 | Rawlinson ............ B60N 2/062 |
| 9,604,559 | B2 | * | 3/2017 | Yoo ........................ B60N 2/666 |
| 9,694,723 | B2 | * | 7/2017 | Shimizu ............... B60N 2/4228 |
| 9,744,891 | B2 | * | 8/2017 | Cho ..................... B60N 2/6671 |

\* cited by examiner

*Primary Examiner* — Lori L Lyjak
(74) *Attorney, Agent, or Firm* — Christopher G. Darrow; Darrow Mustafa PC

(57) ABSTRACT

A mechanical lumbar system for vehicle seating. The lumbar system may be compact in size so as to require a smaller space within vehicle seating. The lumbar system may be adjustable in 4-ways. The lumbar system may be adjustable in an in and out fashion so as to decrease and increase, respectively, the amount of lumbar support. The lumbar system may be adjustable vertically so as to allow the vertical position of the lumbar support to be moved to accommodate the occupant. The lumbar system may utilize a U-shaped lower bridge member that allows the motors to be positioned vertically higher in the seat back while also allowing the lumbar support to be positioned below the motors. The legs of the lower bridge may extend below the lower frame cross member in the vehicle seat.

20 Claims, 14 Drawing Sheets

COMPACT MECHANICAL LUMBAR VEHICLE SEATING

FIELD

The subject matter described herein relates in general to vehicle seating and, more particularly, to a compact mechanical lumbar system for a vehicle seat.

BACKGROUND

Modern vehicles commonly have a variety of features integrated into the seating. For example, adjustable lumbar systems, ventilation systems, articulation systems and inflatable restraint systems can be integrated into vehicle seating. These various features all occupy space within the vehicle seating and may limit the size and shape of the vehicle seating to accommodate these various systems. The desired performance envelop for these systems may constrain the size and positioning of these systems within the vehicle seating. Thus, it would be advantageous to provide compact systems for vehicle seating.

Modern vehicle manufacturing typically utilizes standardized components across multiple vehicle lines to reduce cost and provide commonality. The different vehicle lines, however, may have differing space allocations for some components, such as that for vehicle seating. Accordingly, the space available for seating in different vehicle lines may vary. Thus, it would be advantageous to provide compact systems for vehicle seating that facilitates the use of the systems across multiple vehicle lines.

SUMMARY

A mechanical lumbar system for vehicle seating. The lumbar system may be compact in size so as to require a smaller space within vehicle seating. The lumbar system may be adjustable in 4-ways. The lumbar system may be adjustable in an in and out fashion so as to decrease and increase, respectively, the amount of lumbar support. The lumbar system may be adjustable vertically so as to allow the vertical position of the lumbar support to be moved to accommodate the occupant. The lumbar system may utilize an inverted U-shaped lower bridge member that allows the motors to be positioned vertically higher in the seat back while also allowing the lumbar support to be positioned below the motors. The legs of the lower bridge may extend below the lower frame cross member in the vehicle seat.

In one respect, the present disclosure is directed to a vehicle seat. The seat has a seat bottom and a seat back is operatively coupled to the seat bottom. A lumbar support system is disposed in the seat back. The lumbar support system includes a frame having a pair of extending members, an upper bridge member, a lower bridge member and a pair of lumbar bands. The upper bridge member is operatively coupled to the extending members and movable there along. The lower bridge member is operatively coupled to the extending members below the upper bridge member and movable there along. The lower bridge member has a central portion and a pair of legs extending downwardly from the central portion. A top end portion of each lumbar band is operatively coupled to the upper bridge member and a lower end portion of each lumbar band is operatively coupled to a leg of the lower bridge member. The upper and lower bridge members may move along the extending members in unison to adjust a vertical position of the lumbar bands and may move along the extending members relative to one another to adjust a level of support provided by the lumbar bands.

In another respect, the present disclosure is directed to a vehicle. The vehicle has a door, an interior operable to accommodate one or more occupants and a seat operable to support an occupant. The seat includes a seat bottom, a seat back operatively coupled to the seat bottom and a lumbar support system disposed in the seat back. The lumbar support system includes a frame having a pair of extending members, an upper bridge member, a lower bridge member and a pair of lumbar bands. The upper bridge member is operatively coupled to the extending members and movable there along. The lower bridge member is operatively coupled to the extending members below the upper bridge member and movable there along. The lower bridge member is generally shaped as an inverted U and has a central portion and a pair of legs extending downwardly from the central portion. A top end portion of each lumbar band is operatively coupled to the upper bridge member and a lower end portion of each lumbar band is operatively coupled to a leg of the lower bridge member. The upper and lower bridge members may move along the extending members in unison to adjust a vertical position of the lumbar bands and may move along the extending members relative to one another to adjust a level of support provided by the lumbar bands.

In yet another respect, the present disclosure is directed to a vehicle seat. The seat has a seat bottom, a seat back and a lumbar support system. The seat back is operatively coupled to the seat bottom and has an internal frame including upper and lower cross members extending between a pair of vertically extending side rails. The lumbar support system is disposed in the seat back. The lumbar support system includes a frame having a pair of extending members, an upper bridge member, a lower bridge member, and a pair of lumbar bands. The upper bridge member is operatively coupled to the extending members and movable there along. The lower bridge member is operatively coupled to the extending members below the upper bridge member and movable there along. The lower bridge member has a central portion and a pair of legs extending downwardly from the central portion. A top end portion of each lumbar band is operatively coupled to the upper bridge member and a lower end portion of each lumbar band is operatively coupled to a leg of the lower bridge member. The legs of the lower bridge member extend below the lower cross member when the lower bridge member is in a lowermost position. The upper and lower bridge members may move along the extending members in unison to adjust a vertical position of the lumbar bands and may move along the extending members relative to one another to adjust a level of support provided by the lumbar bands.

DETAILED DESCRIPTION

Figure 1:
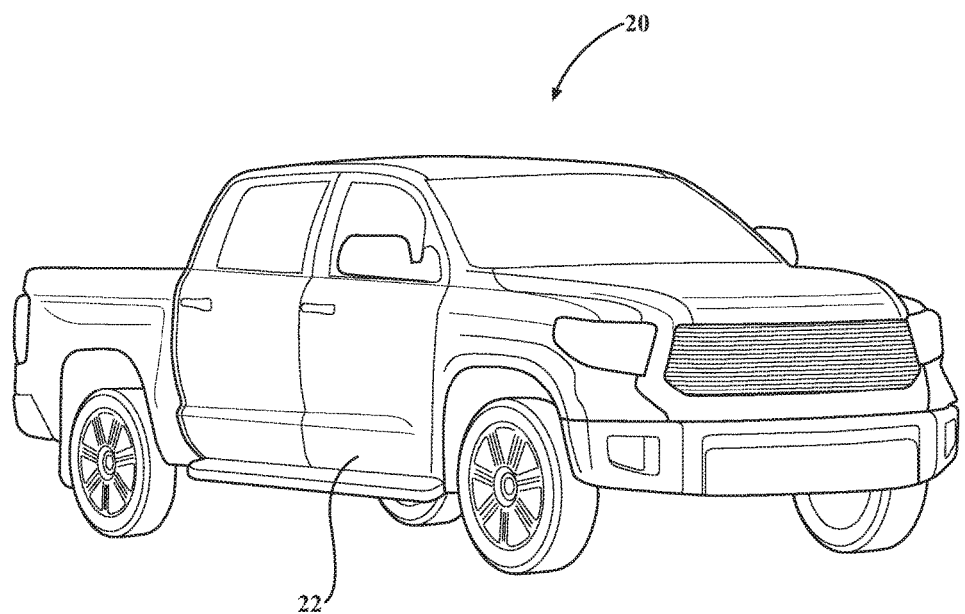
FIG. 1 is a perspective view of an exemplary vehicle in which vehicle seating is utilized.

This detailed description relates a mechanical lumbar system for vehicle seating. The lumbar system may be compact in size so as to require a smaller space within vehicle seating. The lumbar system may be adjustable in 4-ways. The lumbar system may be adjustable in an in and out fashion so as to decrease and increase, respectively, the amount of lumbar support. The lumbar system may be adjustable vertically so as to allow the vertical position of the lumbar support to be moved to accommodate the occupant. The lumbar system may utilize a U-shaped lower bridge member that allows the motors to be positioned vertically higher in the seat back while also allowing the lumbar support to be positioned below the motors. The legs of the lower bridge may extend below the lower frame cross member in the vehicle seat.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a vehicle 20 is shown. As used herein, "vehicle" means any form of motorized transport. In one or more implementations, vehicle 20 can be an automobile. While arrangements will be described herein with respect to automobiles, it will be understood that embodiments are not limited to automobiles. In some implementations, vehicle 20 may be a watercraft, an aircraft, a train, a space craft or any other form of motorized transport.

Vehicle 20 can define an interior that can be configured to transport one or more vehicle occupants. For example, vehicle 20 can generally include a door 22 that may be opened to allow access to the interior compartment therein. In one or more arrangements, vehicle 20 can include one or more seats 24 operatively connected to the floor of vehicle 20. The term "operatively connected" as used throughout this description, can include direct or indirect connections, including connections without direct physical contact. For example, seats 24 may be operatively connected to one or more rails 25 operatively connected to the floor. Seats 24 can be configured for movement within the interior. For example, seats 24 can be configured for fore and aft movement along the rails.

Seat 24 can include any combination of features to provide comfort, support, and/or safety to an occupant. In one or more arrangements, seat 24 can include a back 26 and a bottom 28 to support an occupant. For instance, back 26 can be configured for selected positioning in generally upstanding orientations with respect to bottom 28.

Bottom 28 can include a base 30 to provide support to bottom 28 and aid in the operative connection of seat 24 to vehicle 20. Bottom 28 can include a bottom cushion 32 to provide comfort and support to an occupant. In one or more arrangements, base 30 may include, or be operatively connected to, structure that allows the selective movement of seat 24 in a fore and aft motion relative to vehicle 20. For example, a control switch 34 may be disposed on an outboard side of seat 24. Movement of switch 34 in a fore and aft motion may result in corresponding fore and aft movement of seat 24 along rails 25. In one or more arrangements, base 30 may include, or be operatively connected to, structure that allows the selective movement of back 26 relative to bottom 28 between reclined and upright orientations. For example, a control switch 36 may be disposed on an outboard side of seat 24. Rotation or movement of switch 36 may result in corresponding relative rotation of back 26 relative to bottom 28. In one or more arrangements, base 30 may include, or be operatively connected to, structure that allows the selective movement of a lumbar support within back 26. For example, a control switch 38 may be disposed on an outboard side of seat 24. Movement of switch 38 may result in corresponding movement of a lumbar support up and down along back 26 and/or in and out relative to back 26, as described below.

Figure 2:
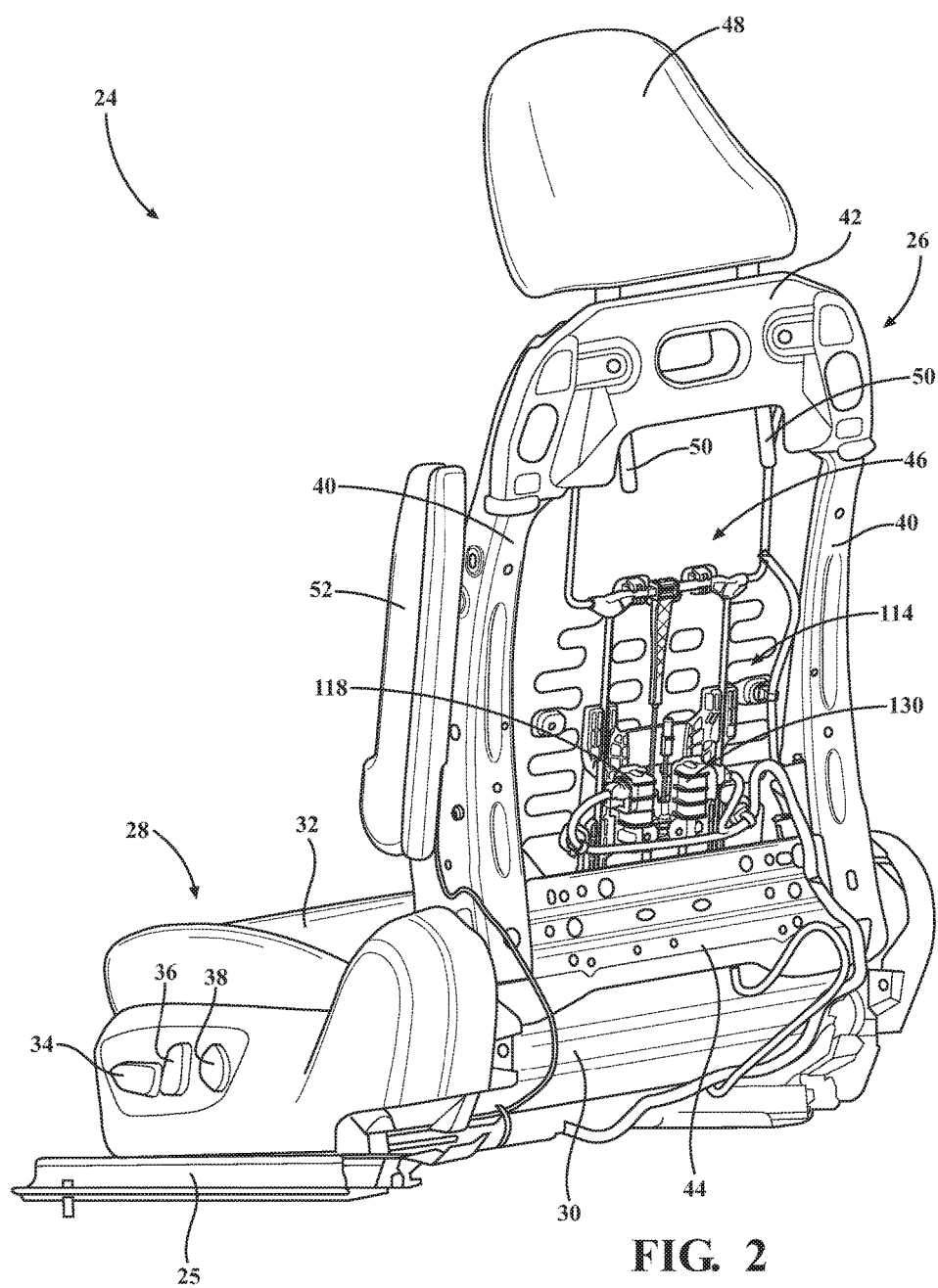
FIG. 2 is an exemplary vehicle seat with the seat back cover removed and incorporating an exemplary mechanical lumbar system.
Figure 3:
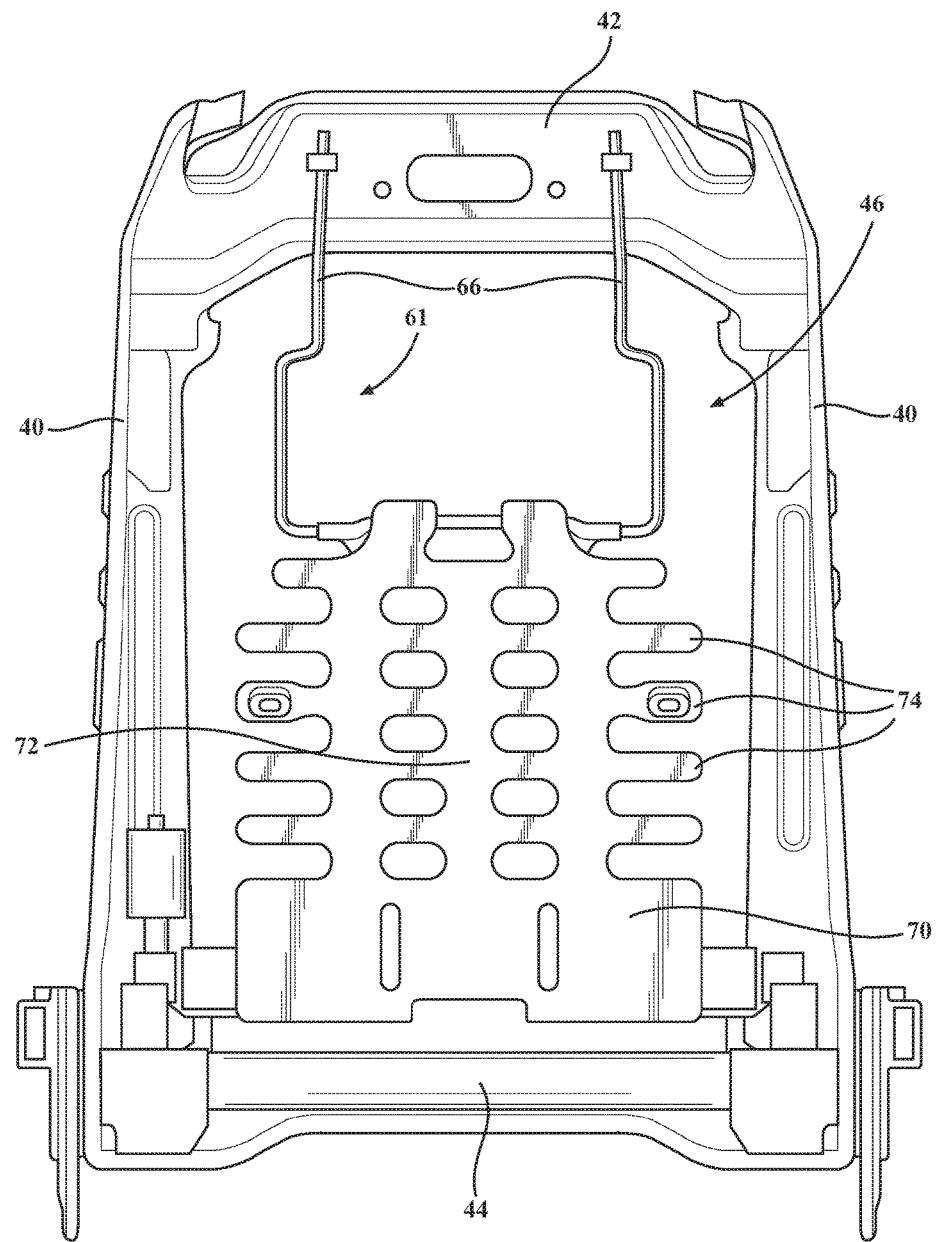
FIG. 3 is a front plan view of a portion of the seat back of FIG. 2.
Figure 4:
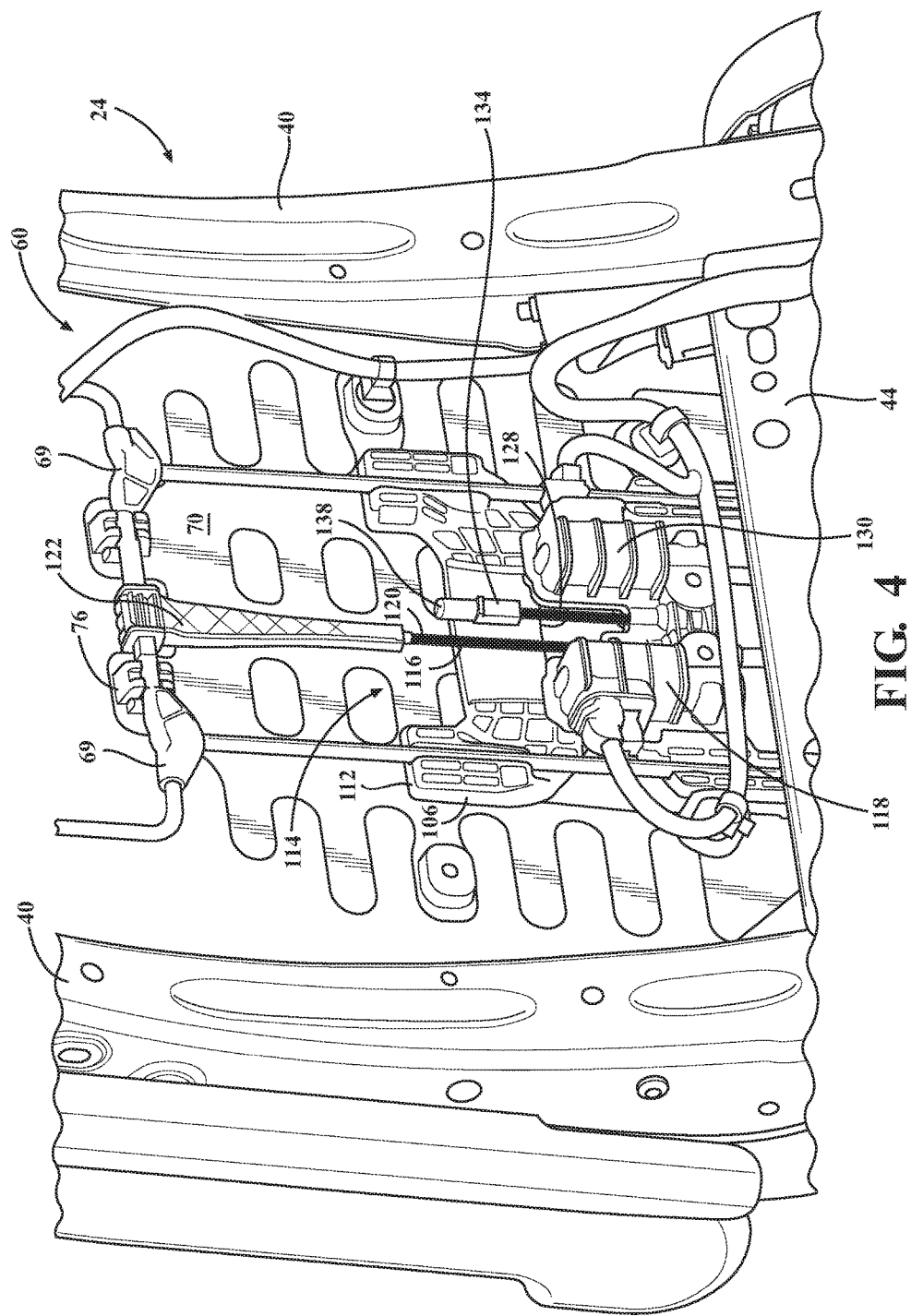
FIG. 4 is a fragmented view of a portion of the rear of the seat back of FIG. 2.
Figure 5:
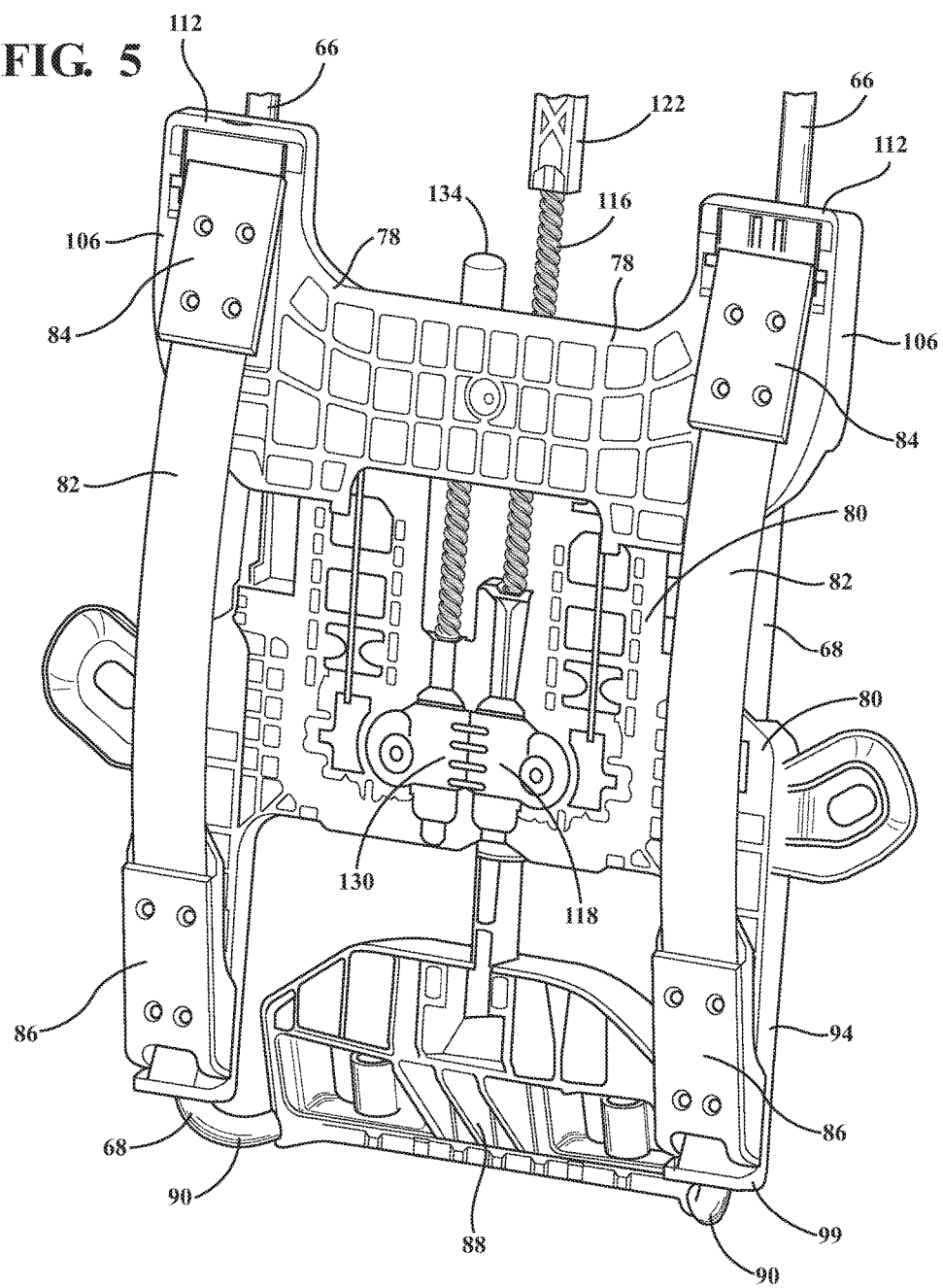
FIG. 5 is a fragmented view of the exemplary mechanical lumbar system.
Figure 6:
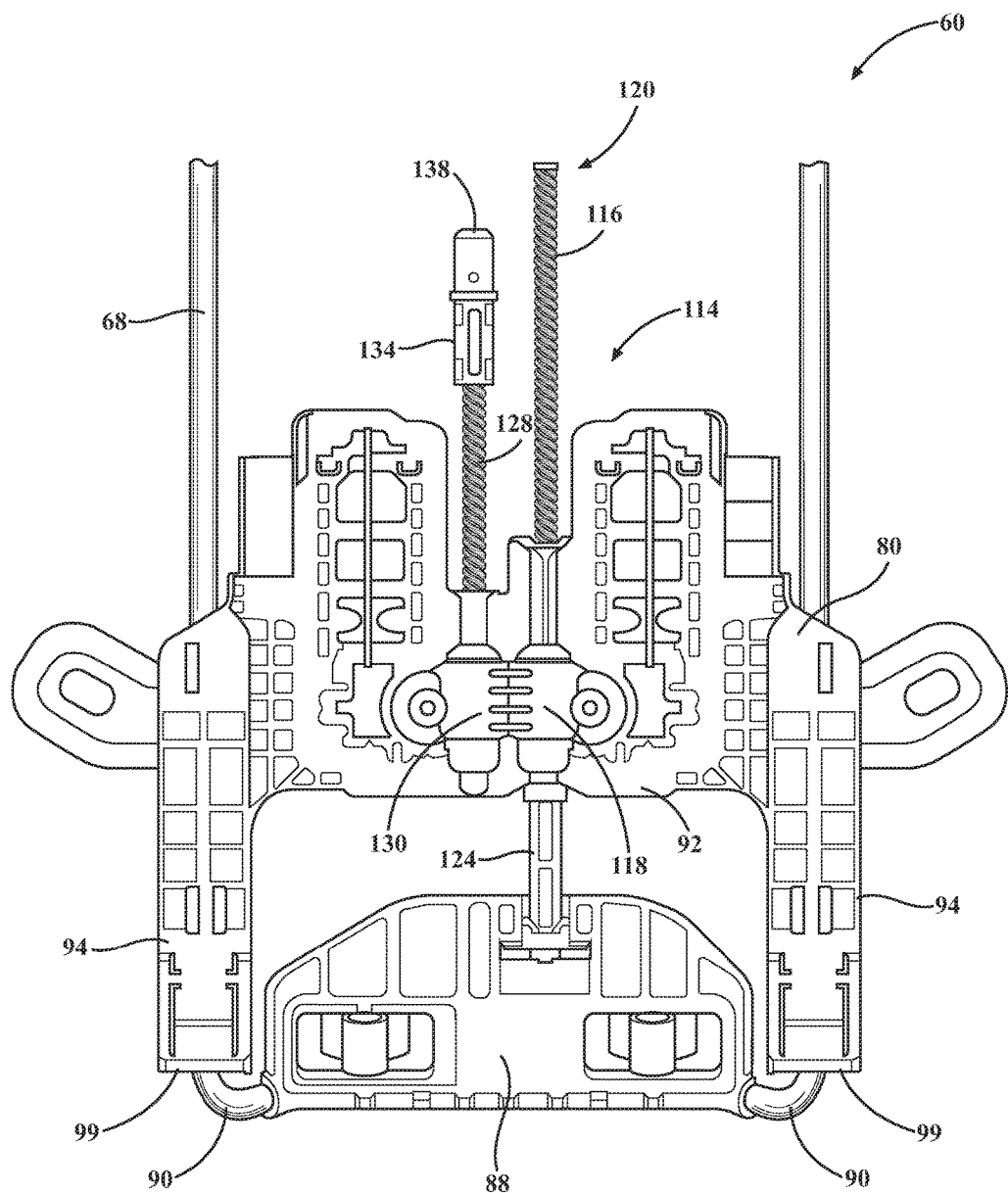
FIGS. 6-7 are fragmented front and rear plan views illustrating the lower bridge member of the exemplary mechanical lumbar system.
Figure 7:
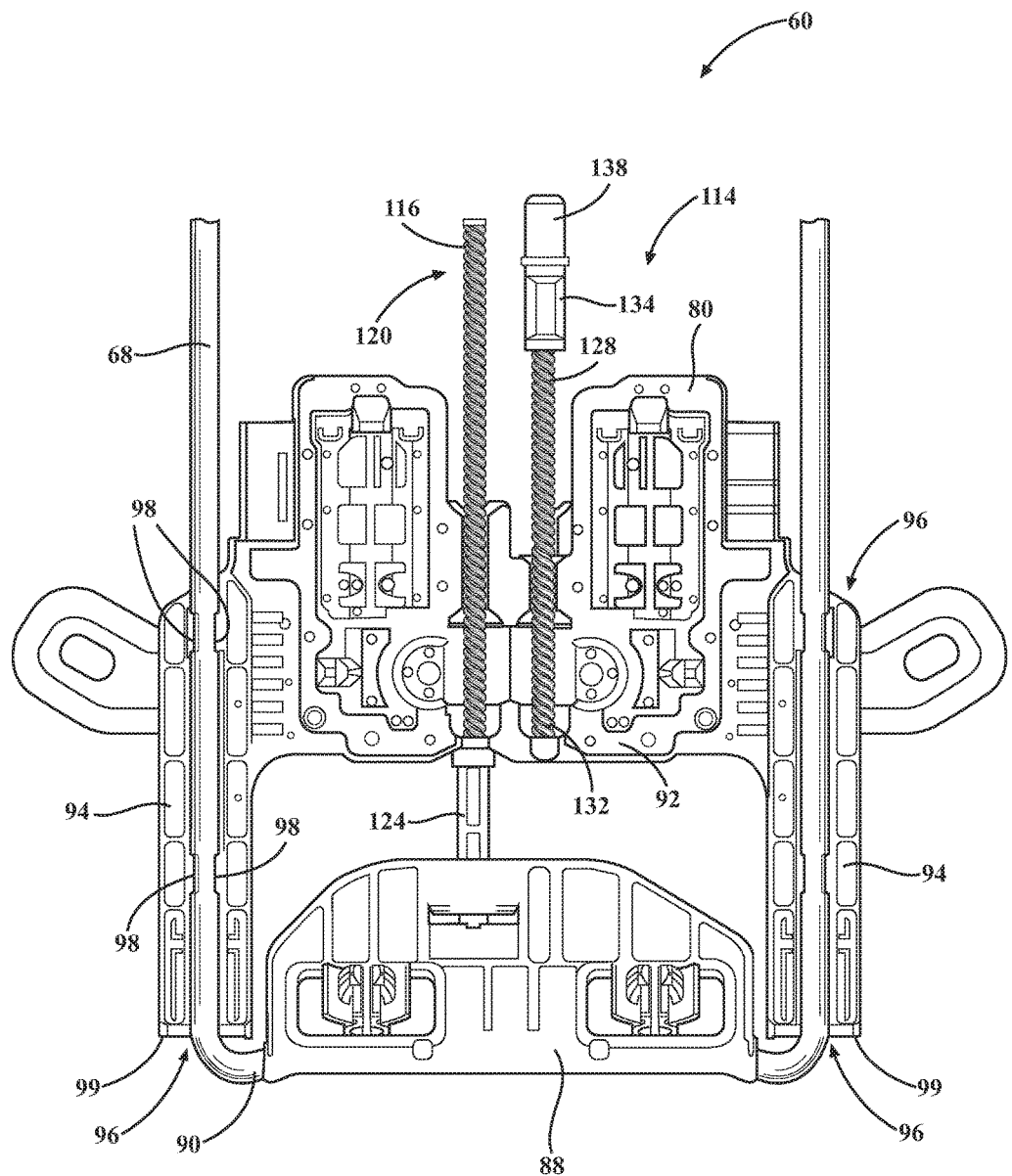
Figure 8:
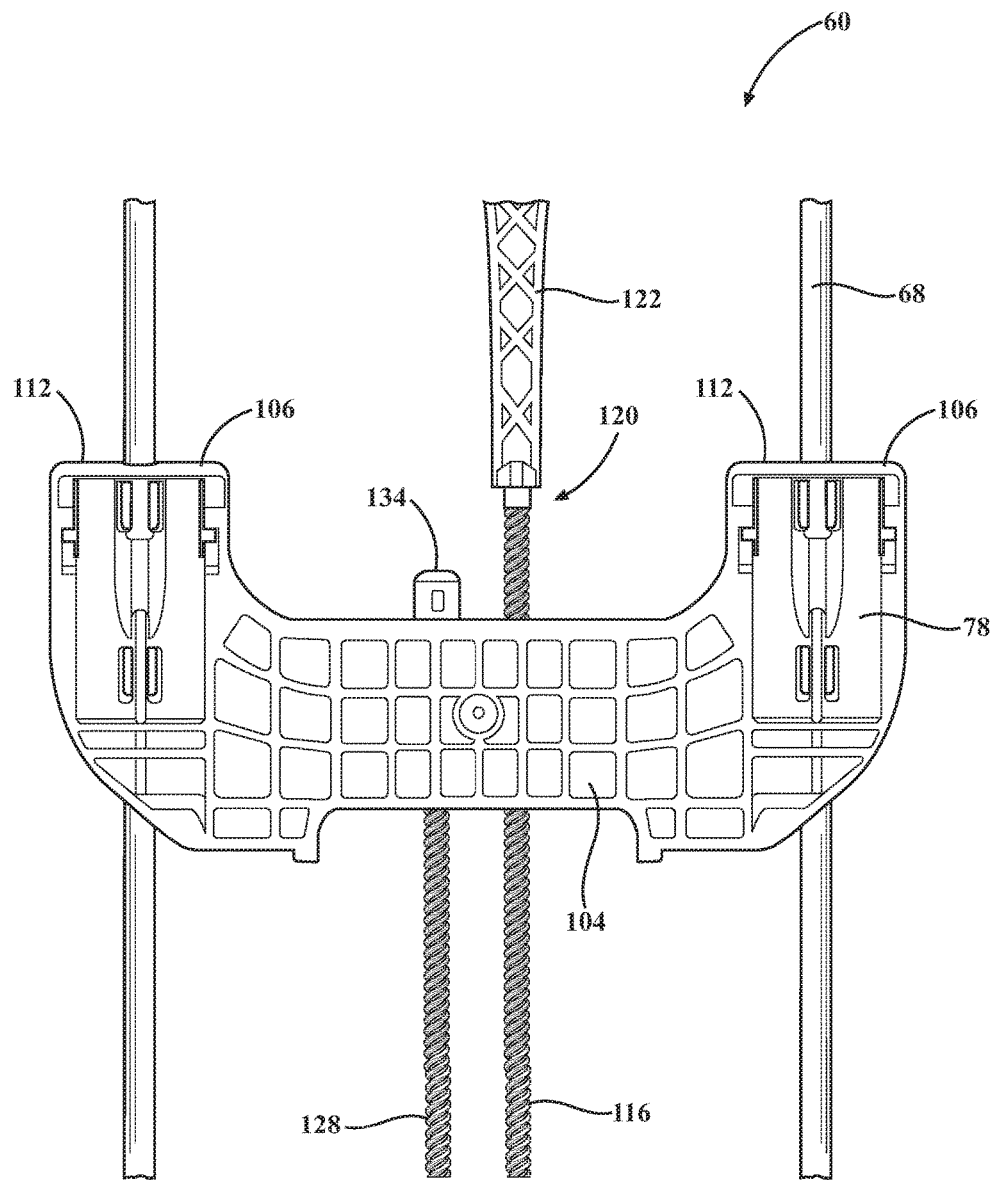
FIGS. 8-9 are fragmented front and rear plan views illustrating the upper bridge member of the exemplary mechanical lumbar system.
Figure 9:
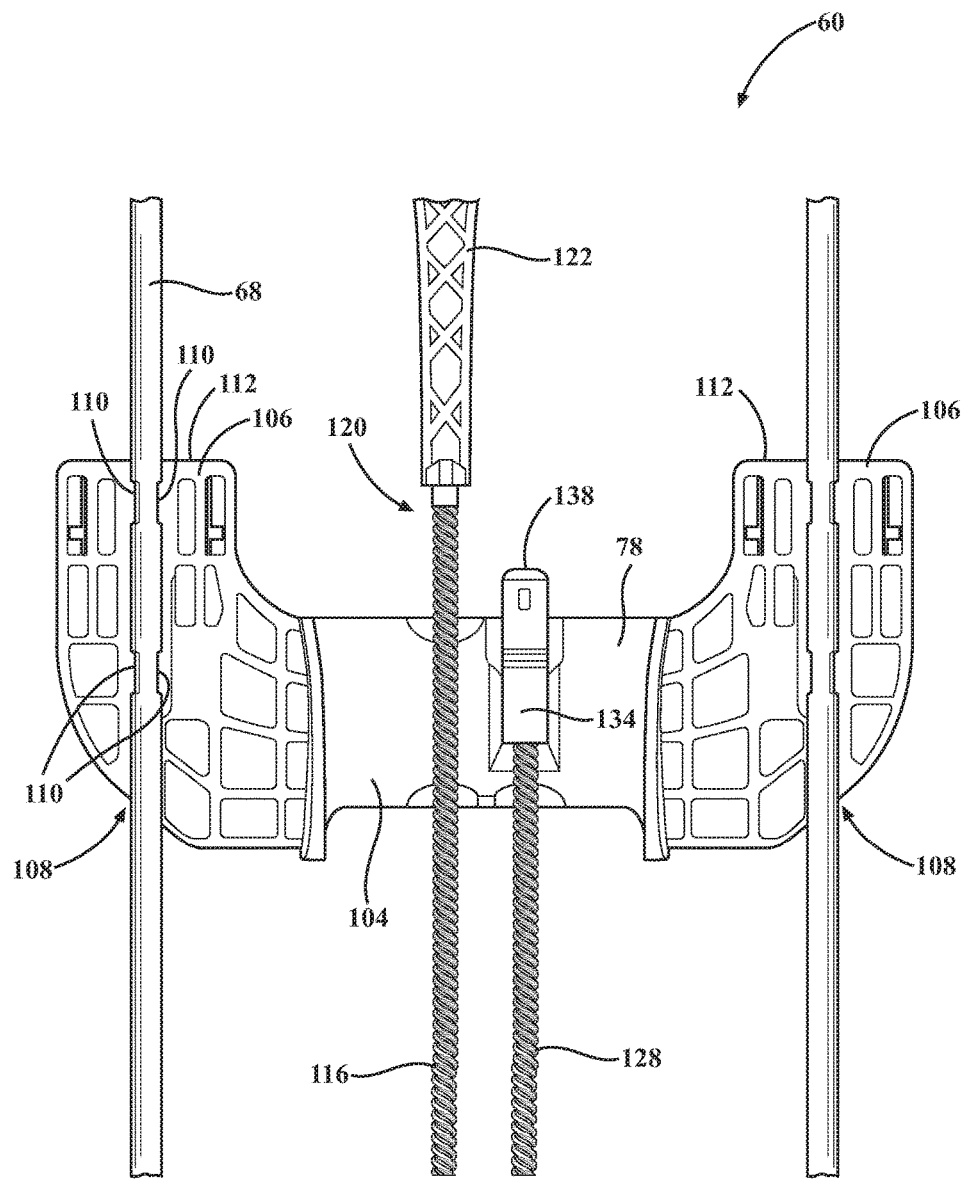
Figure 10:
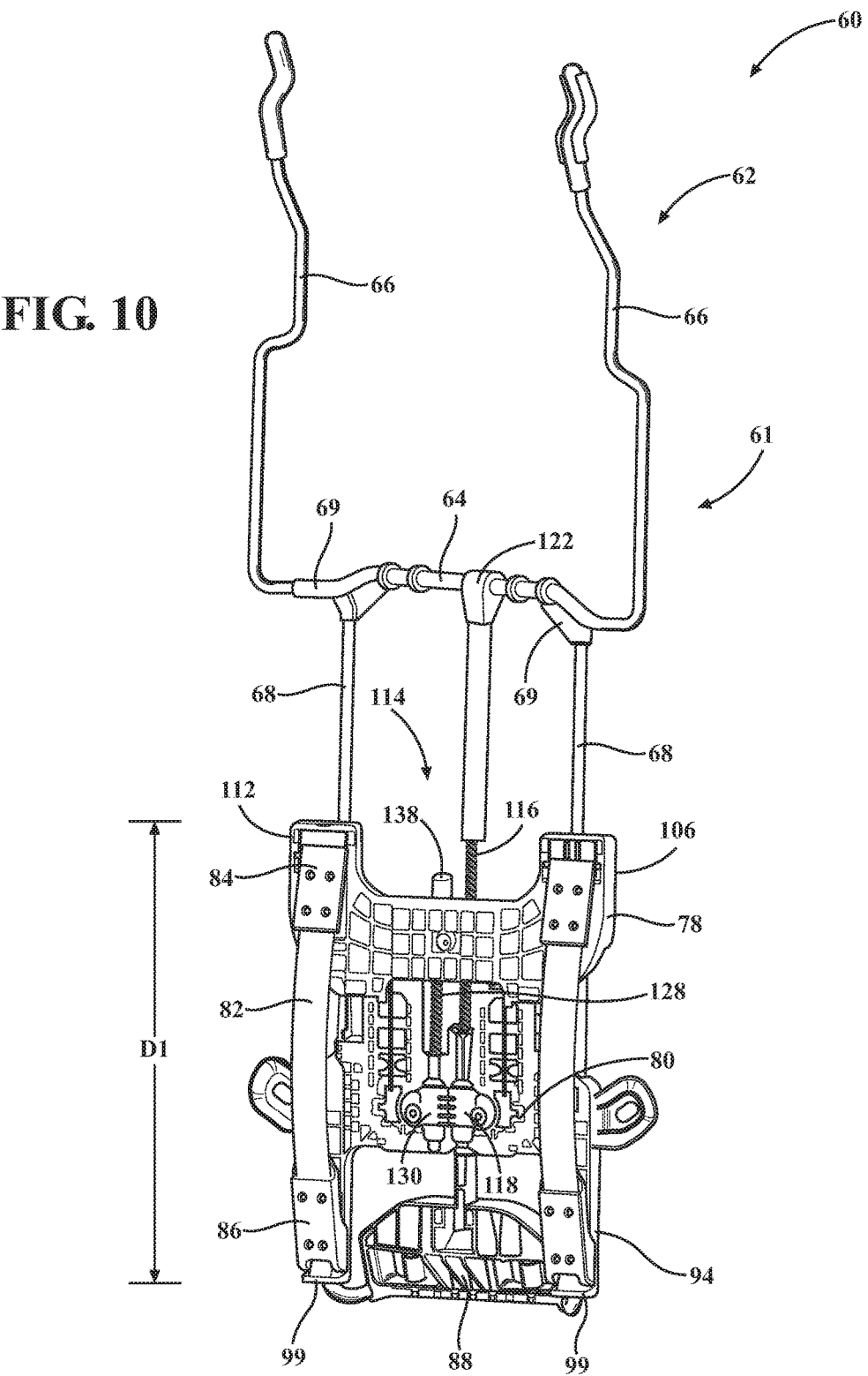
FIG. 10 is a perspective view of the exemplary mechanical lumbar system in a lower and fully retracted condition.
Figure 11:
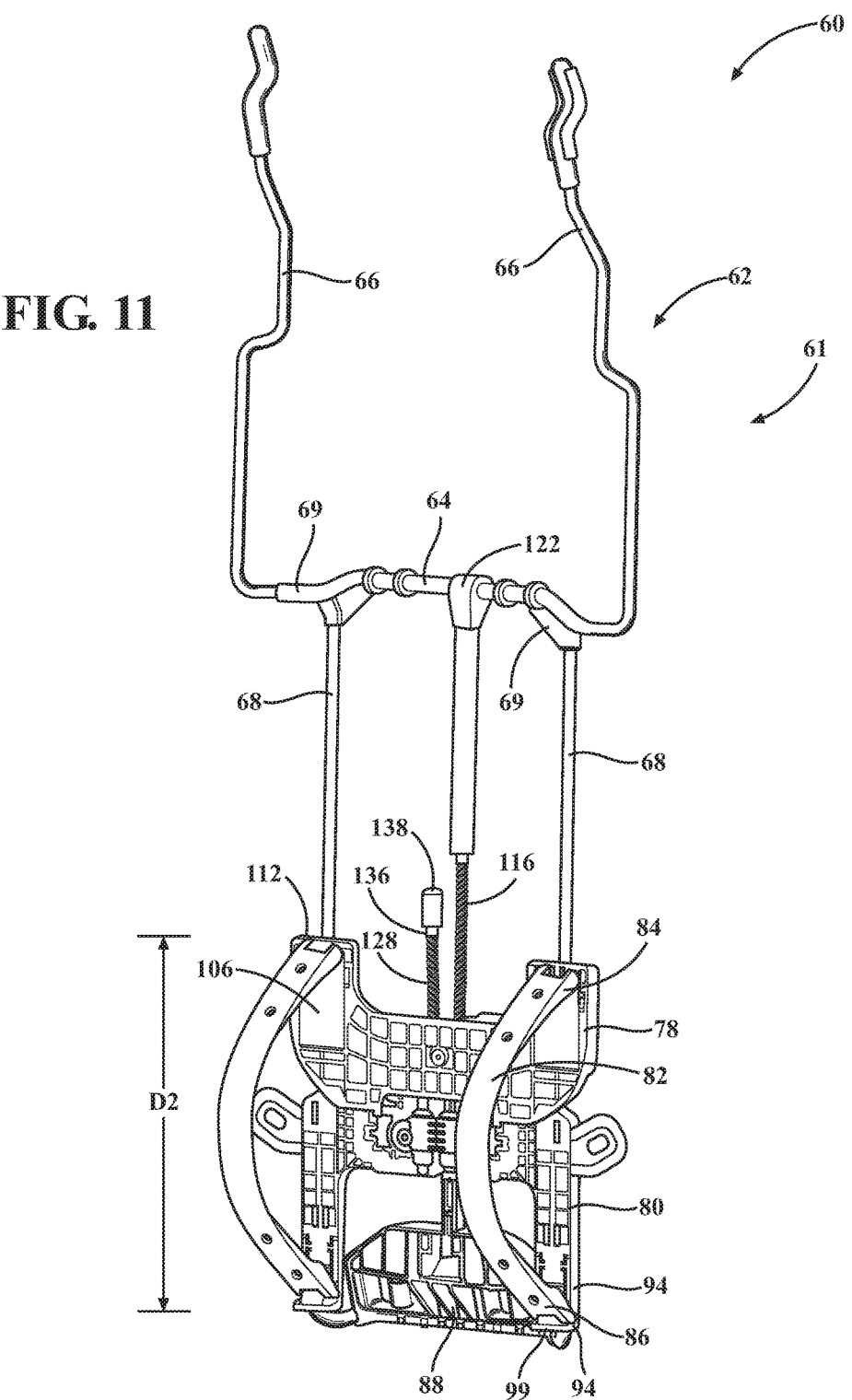
FIG. 11 is a perspective view of the exemplary mechanical lumbar system in a lower and fully extended condition.
Figure 12:
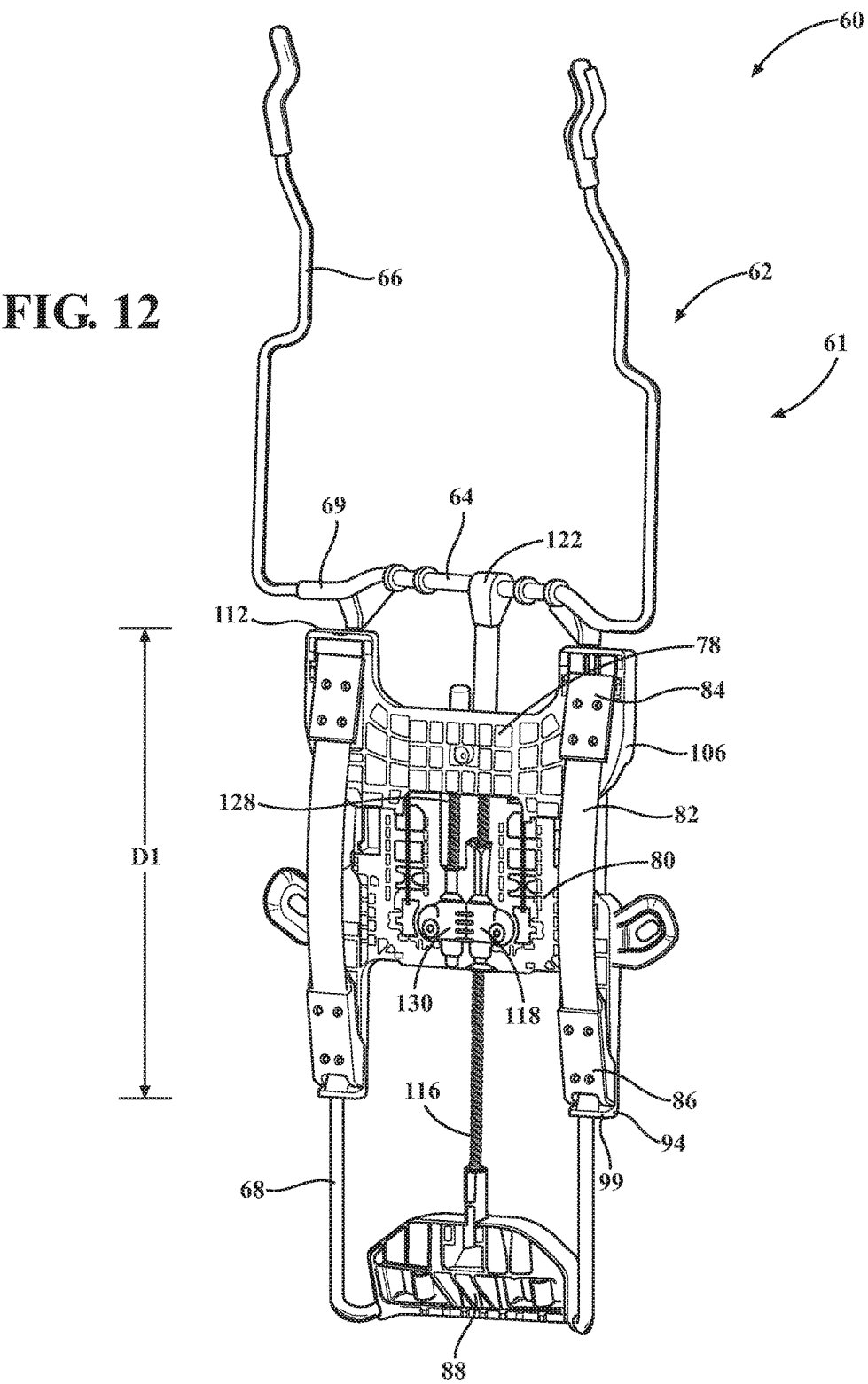
FIG. 12 is a perspective view of the exemplary mechanical lumbar system in an upper and fully retracted condition.

Referring to FIGS. 2-4, in one or more arrangements, back 26 may include a frame having a pair of laterally spaced apart side members 40 extending between an upper cross member 42 and a lower cross member 44. Side members 40 may be operatively coupled to upper and lower cross members 42, 44 in any well know manner, such as by fasteners, welding and the like by way of non-limiting example. Side members 40, upper cross member 42 and lower cross member 44 may define an interior cavity 46 within back 26. A head rest 48 may have a pair of rods 50 extending therefrom. Rods 50 may fit within corresponding receptacles within upper cross member 42 that allow the vertical position of head rest 48 to be adjusted relative to upper cross member 42. Back 26 may include one or more adjustable arm rests 52 coupled to side members 40.

Referring to FIGS. 2-15, seat 24 may include a mechanical lumbar system 60. Lumbar system 60 may be operable to provide an adjustable support to the lumbar region of an occupant of seat 24. Lumbar system 60 may be disposed in interior cavity 46 of back 26. Lumbar system 60 may include a generally H-shaped frame 61 that may couple lumbar system 60 to seat 24. Frame 61 may include a generally U-shaped upper frame member 62 which may include a cross member 64 and a pair of laterally spaced apart upper extending members 66. Upper extending members 66 may extend in an upward direction from cross member 64. Frame 61 may include a pair of laterally spaced apart lower extending members 68. Lower extending members may extend downwardly from cross member 64. Upper extending members 66 may be integral with or operatively coupled to upper cross member 42. Lower extending members 68 may be parallel to one another. In one or more arrangements, lower extending members 68 may be operatively coupled to cross member 64 with a pair of brackets 69. In one or more arrangements, brackets 69 may also couple upper extending members 66 to cross member 64. For example, brackets 69 may each have three passages or bores into which portions of cross member 64, upper extending member 66 and lower extending member 68 are disposed and secured therein. In this manner, brackets 69 may operatively couple the components of frame 61 together in a generally H-shaped configuration. In one or more arrangements, cross member 64, upper extending members 66, and/or lower extending members 68 may be round rods or tubes having a circular cross-section.

In one or more arrangements, lumbar system 60 may include a support member 70 that faces an occupant of seat 24. Support member 70 may have a central section 72 with a plurality of arms 74 extending laterally therefrom. Support member 70 may distribute the load from the lumbar support over the lumbar region of an occupant. Support member 70 may be resilient to provide comfort for the occupant. The upper portion of support member 70 may be operatively coupled to cross member 64 while the lower portion of support member 70 may be free floating to allow deflection of support member 70 to accommodate varying amounts of lumbar support to the occupant. By way of example, a pair of snap fittings 76 may be attached to the upper portion of support member 70 and be snapped onto cross member 64 to provide attachment between support member 70 and cross member 64.

In one or more arrangements, lumbar system 60 may include moveable upper and lower bridge members 78, 80 that extend laterally between lower extending members 68. Upper and lower bridge members 78, 80 may be vertically moveable along lower extending members 68 to move the lumbar support vertically relative to back 26, as described in more detail below. Upper and lower bridge members 78, 80 may be moved vertically relative to one another along lower extending members 68 to provide varying levels of lumbar deflection, as described in more detail below. A pair of lumbar bands or arch members 82 may be operatively coupled to upper and lower bridge members 78, 80. For example, lumbar bands 82 may be laterally spaced apart and each may have an upper end 84 operatively coupled to upper bride member 78 and a lower end 86 operatively coupled to lower bridge member 80. Lumbar bands 82 may be resilient and made be made from metal or a polymer, by way of non-limiting example. Lumbar bands 82 may take a varying arch shape to provide varying levels of lumbar support (deflection) based on the relative positions of upper and lower bride members 78, 80, as discussed in more detail below.

In one or more arrangements, lumbar system 60 may include a base bridge member 88 that may be operatively coupled to and extend laterally between lower ends 90 of lower extending members 68. For example, lower ends 90 may be disposed within internal pockets or bores of base bridge member 88 and secured therein. Base bridge member 88 and cross member 64 may maintain laterally spacing between lower extending members 68 such that lower extending members 68 may be generally parallel to one another. Base bridge member 88 may form a lowermost portion of lumbar system 60. Base bridge member 88 may be adjacent to lower cross member 44. In one or more arrangements, base bridge member 88 may extend vertically lower than lower cross member 44 within interior cavity 46. Base bridge member 88 may be made from a metal or a polymer, by way of non-limiting example. In one or may arrangement, base bridge member 88 may be coupled to lower cross member 44 or may be free-floating within interior cavity 46.

In one or more arrangements, lower bridge member 80 may be generally U-shaped. For example, lower bridge member 80 may include a central portion 92 and a pair of downwardly extending legs 94. Central portion 92 may extend laterally between lower extending members 68 while legs 94 may extend vertically along lower extending members 68. Central portion 92 and legs 94 may be integral with one another or be separate components operatively coupled together. Legs 94 may extend downwardly relative to central portion 92 and may form a generally inverted U-shape. Lower bridge member 80 is operable to move vertically along lower extending members 68. For example, legs 94 may include a vertically extending channel 96 configured and arranged to allow lower extending members 68 to reside therein. Channels 96 may include retaining tabs 98 to retain lower extending members 68 therein. For example, tabs 98 and the adjacent portion of channel 96 may circumscribe a majority portion of lower extending member 68 to inhibit removal of lower extending member 68 from channel 96. As such, tabs 98 and channel 96 may retain lower bridge member 80 secured to lower extending members 68 while allowing relative vertical movement. Lower bridge member 80 may be made from a metal or a polymer, by way of non-limiting example. Lower ends 86 of lumbar bands 82 may be operatively coupled to lower end portions 99 of legs 94. This coupling may allow lumbar bands 82 to reach into a lower level of seat 24.

In one or more arrangements, upper bridge member 78 may be generally U-shaped. For example, upper bridge member 78 may include a central portion 104 and a pair of upwardly extending legs 106. Central portion 104 may extend laterally between lower extending members 68 while legs 106 may extend vertically along lower extending members 68. Central portion 104 and legs 106 may be integral with one another or be separate components operatively coupled together. Legs 106 may extend upwardly relative to central portion 104 and may form a generally upright U-shape. Upper bridge member 78 is operable to move vertically along lower extending members 68. For example, legs 106 may include a vertically extending channel 108 configured and arranged to allow lower extending members 68 to reside therein. Channels 108 may include retaining tabs 110 to retain lower extending members 68 therein. For example, tabs 110 and the adjacent portion of channel 108 may circumscribe a majority portion of lower extending member 68 to inhibit removal of lower extending member 68 from channel 108. As such, tabs 110 and channel 108 may retain upper bridge member 78 secured to lower extending members 68 while allowing relative vertical movement. Upper bridge member 78 may be made from a metal or a polymer, by way of non-limiting example. Upper ends 84 of lumbar bands 82 may be operatively coupled to upper end portions 112 of legs 106.

In one or more arrangements, lumbar system 60 includes a drive system 114. Drive system 114 may be operable to move upper and lower bridge members 78, 80 in unison and relative to one another along lower extending members 68 to alter the positioning and degree of support provided to an occupant of seat 24. Drive system 114 may include a positioning spindle 116 coupled to a positioning motor 118. An upper end portion 120 of positioning spindle 116 may be operatively coupled to cross member 64 by way of a bracket 122. Bracket 122 may maintain positioning spindle 116 stationary (vertically and rotationally) relative to frame 61. A lower end portion 124 of positioning spindle 116 may be operatively coupled to base bridge member 88. The coupling of lower end portion 124 to base bridge member 88 may maintain positioning spindle 116 stationary (vertically and rotationally) relative to frame 61. Positioning motor 118 may be operatively coupled to lower bridge member 80 and engaged with positioning spindle 116. Positioning motor 118 may be operable to move upper and lower bridge members 78, 80 vertically along lower extending member 68. For example, positioning spindle 116 may have a threaded exterior surface and positioning motor 118 may include a drive nut engaged with the threaded surface that rotates relative to positioning spindle 116 with operation of positioning motor 118. Rotation of the drive nut by positioning motor 118 in a first direction may cause lower bridge member 80 to move along positioning spindle 116 in a first vertical direction while rotation of the drive nut by positioning motor 118 in a second direction (opposite the first direction) may cause lower bridge member 80 to move along positioning spindle 116 in a second vertical direction (opposite the first direction). Upper bridge member 78, which may be maintained stationary relative to lower bridge member 80 by drive system 114, may move vertically with the movement of lower bridge member 80. The vertical movement of upper and lower bridge members 78, 80 along lower extending members 68 allows the positioning of the lumbar bands 82 to be adjusted up/down relative to seat 24. Operation of positioning motor 118 may be controlled by operation of lumbar switch 38.

In one or more arrangements, drive system 114 may include a deflection spindle 128 coupled to a deflection motor 130. Deflection spindle 128 may have a threaded exterior surface and a lower end portion 132 of deflection spindle 128 may be operatively coupled to deflection motor 130 such that deflection motor 130 is operable to rotate deflection spindle 128. Deflection motor 130 may be operatively coupled to lower bridge member 80 such that deflection spindle 128 and deflection motor 130 are vertically stationary with respect to lower bridge member 80. Deflection motor 130 may be operable to move upper bridge member 78 vertically along lower extending member 68 relative to lower bridge member 80. For example, deflection spindle 128 may be operatively coupled to upper bridge member 78 by a bracket 134 engaged with the threaded exterior surface. Bracket 134 may be stationary with respect to upper bridge member 78 and allow deflection spindle 128 to rotate relative thereto. The threaded engagement between bracket 134 and deflection spindle 128 may allow deflection motor 130 to drive vertical movement of upper bridge member 78 relative to lower bridge member 80 due to rotation of deflection spindle 128. For example, deflection motor 130 may drive rotation of deflection spindle 128 in a first direction which may cause upper bridge member 78 to move along deflection spindle 128 (and lower extending members 68) in a first vertical direction relative to lower bridge member 80 while driving rotation of deflection spindle 128 in a second direction (opposite the first direction) may cause upper bridge member 78 to move along deflection spindle 128 (and lower extending members 68) in a second vertical direction (opposite the first direction) relative to lower bridge member 80. The change in relative vertical positioning between upper and lower bridge members 78, 80 adjusts the deflection of lumbar bands 82. Deflection motor 130 may maintain deflection spindle 128 rotationally stationary such that the relative vertical positioning between upper and lower bridge member 78, 80 remains constant. An upper end portion 136 of deflection spindle 128 may extend upwardly beyond bracket 134. A cap 138 may be disposed on upper end portion 136 and in one or more arrangements may act as a stop to limit the maximum vertical spacing between upper and lower bridge members 78, 80. Operation of deflection motor 130 may be controlled by operation of lumbar switch 38.

Figure 13:
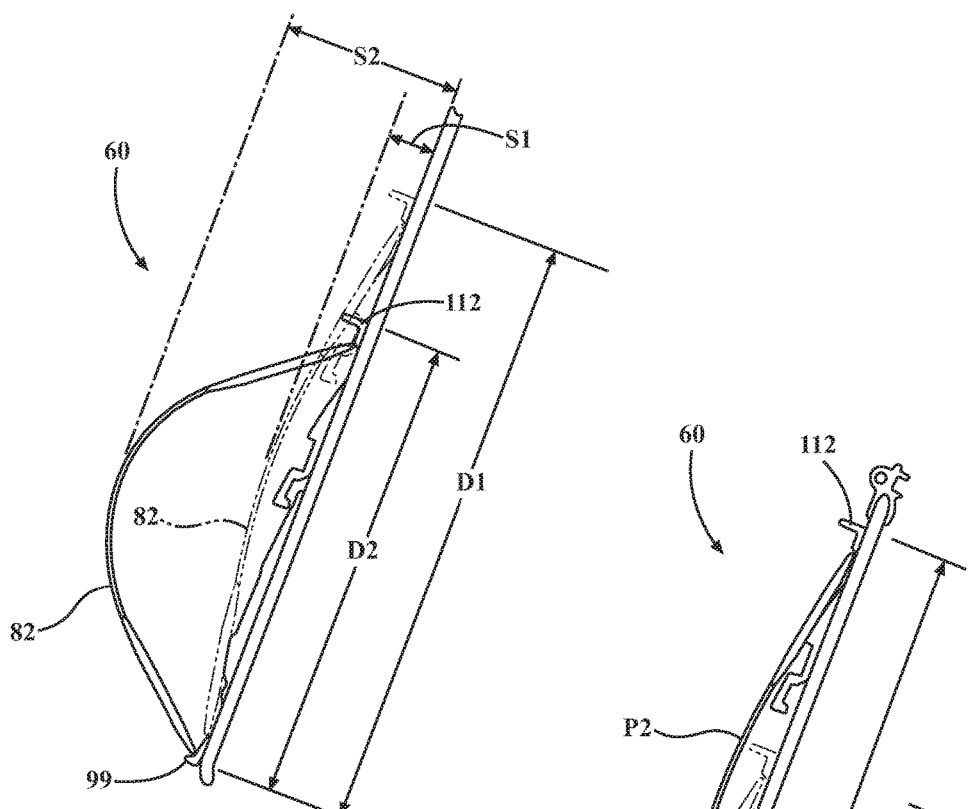
FIG. 13 is a partial side view illustrating the exemplary mechanical lumbar system in a lower position with the lumbar fully extended and retracted.

In one or more arrangements, the lumbar support (deflection) offered to an occupant of seat 24 may be adjusted by moving upper bridge member 78 relative to lower bridge member 80. For example, the distance between upper and lower bridge members 78, 80 may be adjusted between a maximum distance D1 and a minimum distance D2, as shown in FIGS. 10-13, by a user moving lumbar switch 38 horizontally (fore and aft). Maximum distance D1 corresponds to the least amount of support (deflection) S1 of lumbar bands 82 while minimum distance D2 corresponds to the greatest amount of support (deflection) S2 of lumbar bands 82 (shown in phantom), as shown in FIG. 13. The amount of lumbar support may be varied between S1 and S2 by changing the distance between upper and lower bridge members 78, 80 between D1 and D2.

Figure 14:
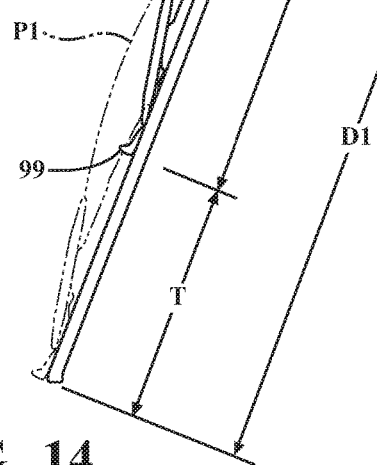
FIG. 14 is a partial side view illustrating the exemplary mechanical lumbar system fully retracted and in a lower and upper position.
Figure 15:
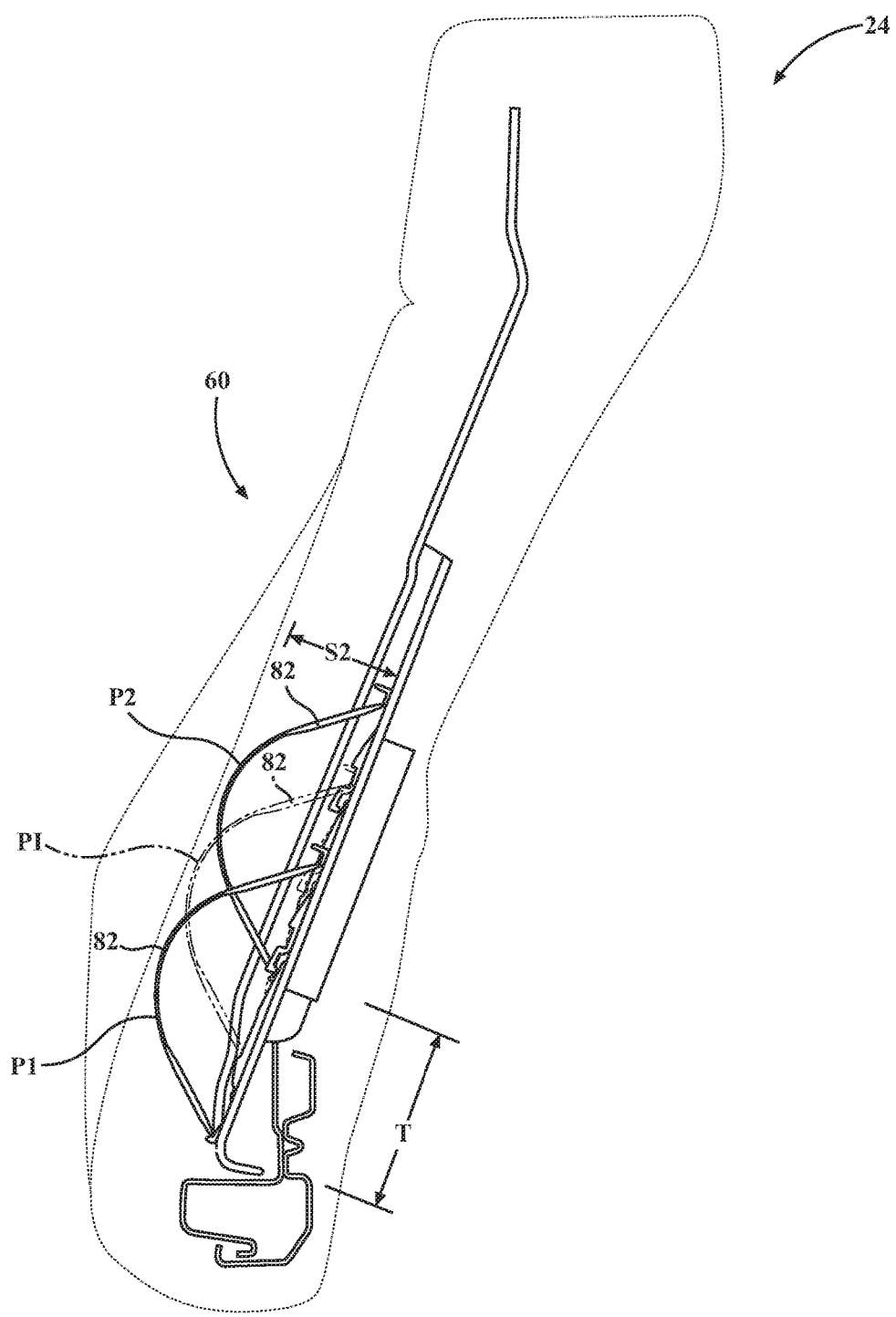
FIG. 15 is a partial side view illustrating the exemplary mechanical lumbar system in a lower, intermediate and upper position with the lumbar fully extended.

In one or more arrangements, the vertical position of the lumbar support along seat 24 may be adjusted by moving upper and lower bridge members 78, 80 in unison relative to seat 24. For example, the position of upper and lower bridge members 78, 80 may be moved between a lowermost position P1 and an uppermost position P2, as shown in FIGS. 14 and 15, by a user moving lumbar switch 38 vertically. Intermediate positions, such as PI (shown in phantom in FIG. 15) may be realized between P1 and P2. The position of the lumbar support may be adjusted regardless of the amount of support (deflection) of lumbar bands 82. For example, the position may be adjusted while the support offered is the least support S1, as shown in FIG. 14, while the support offered is the greatest support S2, as shown in FIG. 15, or at any level of support between S1 and S2. Lumbar system 60 may have a total vertical positioning range of movement T, as shown in FIGS. 14 and 15, which may represent the distance between a lowermost and uppermost position of end portion 99 of leg 44.

In one or more arrangements, the shape of lower bridge member 80 may provide packaging advantages. For example, legs 94 may extend downwardly adjacent to or beyond (lower than) that of lower cross member 44, when in its lowermost position, while central portion 92 may reside above or adjacent to lower cross member 44. As a result, end portions 112 may be positioned lower in seat 24 while central portion 92 is positioned higher in seat 24. The extension of legs 94 allows lower end portions 99 to be at or below that of lower cross member 44 and for lower ends 86 of lumbar bands 82 to be positioned at or below that of lower cross member 44 when lower bridge member 80 is in its lowermost position. The ability to position lower ends 86 lower in seat 24 may advantageously allow for a larger distance over which the lumbar support may be vertically adjusted than that possible if lower ends 86 where coupled to central portion 92. Additionally, lower cross member 44 may occupy a considerable amount of space within the lower portion of interior cavity 46 and as a result the space available for lower bridge member 80 may be limited. The utilization of legs 94 to extend adjacent to or below that of lower cross member 44 while central portion 92 is above lower cross member 44 allows for compact packaging of lumbar system 60 within seat 24 while allowing for significant range of vertical adjustment of the lumbar support. Motors 118, 130 may be advantageously positioned above lower cross member 44 where there may be a larger volume of available space within seat 24. Motors 118, 130 may advantageously be positioned above lower cross member 44 even when lower bridge member 80 is in its lowermost position and lower ends 86 are at or below lower cross member 44. Additionally, motors 118, 130 may be advantageously positioned inboard of lower extending members 68 thereby providing a compact packaging of lumbar system 60. Motors 118, 130 may also be advantageously positioned inboard of lumbar bands 82 thereby providing a compact packaging of lumbar system 60. Spindles 116, 128 may be advantageously positioned inboard of motors 118, 130 thereby providing a compact packaging of lumbar system 60.

In one or more arrangement, the shape of upper bridge member 78 may provide packaging advantages. For example, legs 106 may extend upwardly from central portion 104 such that upper ends 84 of lumbar bands 82 may be positioned higher in seat 24 than central portion 104. The use of legs 106 may allow for upper ends 84 to be adjusted to a closer position to cross member 64 then that possible if upper ends 84 where operatively coupled to central portion 104. As a result, a greater range of vertical positioning of the lumbar support may be realized.

In one or more arrangements, lumbar system 60 may provide desirable operating performance while utilizing a compact system. For example, the support (deflection) of lumbar bands 82 may have a range (S2-S1) of about 39 mm+/−5 mm. As another example, the location of the lumbar support may have a range of travel T of about 80 mm+/−4 mm.

It will be appreciated that arrangements described herein can provide numerous benefits, including one or more of the benefits mentioned herein. For example, arrangements described herein can provide a compact lumbar system 60 so as to require a smaller space within vehicle seating 24. Lumbar system 60 may be adjustable in 4-ways. Lumbar system 60 may be adjustable in an in and out fashion so as to decrease and increase, respectively, the amount of lumbar support. Lumbar system 60 may be adjustable vertically so as to allow the vertical position of the lumbar support to be moved to accommodate the occupant. Lumbar system 60 may utilize a U-shaped lower bridge member 80 that allows the motors 118, 130 to be positioned vertically higher in the seat back while also allowing the lumbar support to be positioned below the motors. Legs 94 of lower bridge member 80 may extend below the lower cross member 64 in vehicle seat 24.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). The term "operatively connected" as used throughout this description, can include direct or indirect connections, including connections without direct physical contact.

The terms related to orientation, such as vertical, horizontal, above, below, longitudinal, lateral, etc. are based on the relative orientation of the components as shown in the FIGs. It should be appreciated that the components may be arranged in a different orientation and that the terms used herein a relative terms.

Aspects herein can be embodied in other forms without departing from the spirit or essential attributes thereof. Accordingly, reference should be made to the following claims, rather than to the foregoing specification, as indicating the scope of the invention. It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means" plus-function format and are not intended to be interpreted based on 35 U.S.C. 112, sixth paragraph, unless and until such claim limitations expressly use the phrase "means for" followed by a statement of function void of further structure.

What is claimed is:

1. A vehicle seat, comprising:
   a seat bottom;
   a seat back operatively coupled to the seat bottom;
   a lumbar support system disposed in the seat back, the lumbar support system including:
   a frame having a pair of extending members;
   an upper bridge member operatively coupled to the extending members and movable there along;
   a lower bridge member operatively coupled to the extending members below the upper bridge member and movable there along, the lower bridge member having a central portion and a pair of legs extending downwardly from the central potion; and
   a pair of lumbar bands, a top end portion of each lumbar band being operatively coupled to the upper bridge member and a lower end portion of each lumbar band being operatively coupled to a leg of the lower bridge member, wherein the upper and lower bridge members may move along the extending members in unison to adjust a vertical position of the lumbar bands and may move along the extending members relative to one another to adjust a level of support provided by the lumbar bands.

2. The vehicle seat of claim 1, wherein the seat back has an internal frame including a lower cross member extending between a pair of vertically extending side rails and wherein the legs of the lower bridge member extend below the lower cross member when the lower bridge member is in a lowermost position.

3. The vehicle seat of claim 2, wherein the central portion of the lower bridge member is disposed above the lower cross member when the lower bridge member is in the lowermost position.

4. The vehicle seat of claim 3, wherein the lumbar system includes a pair of motors, a first one of the motors operable to move the upper and lower bridge members in unison along the extending members, and a second one of the motors operable to move the upper and lower bridge members relative to one another along the extending members.

5. The vehicle seat of claim 4, wherein the pair of motors is operatively coupled to the central portion of the lower bridge member and remain above the lower cross member regardless of a position of the lower bridge member as it moves along the extending members.

6. The vehicle seat of claim 4, wherein the pair of motors is disposed between the extending members.

7. The vehicle seat of claim 2, wherein the lower end portions of the lumbar bands are operatively attached to a lower end portion of the legs and the lower end portions extend below the lower cross member when the lower bridge member is in the lowermost position.

8. The vehicle seat of claim 7, wherein the upper bridge member includes a pair of upwardly extending legs and the upper end portions of the lumbar bands are operatively coupled to the legs of the upper bridge member.

9. The vehicle seat of claim 8, wherein the upper bridge member is generally U-shaped and the lower bridge member is generally shaped as an inverted U.

10. The vehicle seat of claim 1, wherein the lower bridge member is generally shaped as an inverted U.

11. A vehicle comprising:
a door;
an interior operable to accommodate one or more occupants;
a vehicle seat operable to support an occupant, the seat including:
a seat bottom;
a seat back operatively coupled to the seat bottom;
a lumbar support system disposed in the seat back, the lumbar support system including:
a frame having a pair of extending members;
an upper bridge member operatively coupled to the extending members and movable there along;
a lower bridge member operatively coupled to the extending members below the upper bridge member and movable there along, the lower bridge member being generally shaped as an inverted U and having a central portion and a pair of legs extending downwardly from the central potion; and
a pair of lumbar bands, a top end portion of each lumbar band being operatively coupled to the upper bridge member and a lower end portion of each lumbar band being operatively coupled to a leg of the lower bridge member,
wherein the upper and lower bridge members may move along the extending members in unison to adjust a vertical position of the lumbar bands and may move along the extending members relative to one another to adjust a level of support provided by the lumbar bands.

12. The vehicle of claim 11, wherein the seat back has an internal frame including a lower cross member extending between a pair of vertically extending side rails and wherein the legs of the lower bridge member extend below the lower cross member when the lower bridge member is in a lowermost position.

13. The vehicle of claim 12, wherein the central portion of the lower bridge member is disposed above the lower cross member when the lower bridge member is in the lowermost position.

14. The vehicle of claim 13, wherein the lumbar system includes a pair of motors, a first one of the motors operable to move the upper and lower bridge members in unison along the extending members, and a second one of the motors operable to move the upper and lower bridge members relative to one another along the extending members, the pair of motors is operatively coupled to the central portion of the lower bridge member and remain above the lower cross member regardless of a position of the lower bridge member as it moves along the extending members.

15. The vehicle of claim 12, wherein the lower end portions of the lumbar bands are operatively attached to a lower end portion of the legs and the lower end portions extend below the lower cross member when the lower bridge member is in the lowermost position.

16. The vehicle of claim 15, wherein the upper bridge member is generally U-shaped and includes a central portion and a pair of legs extending upwardly from the central portion and the upper end portions of the lumbar bands are operatively coupled to the legs of the upper bridge member.

17. A vehicle seat, comprising:
a seat bottom;
a seat back operatively coupled to the seat bottom, the seat back having an internal frame including upper and lower cross members extending between a pair of vertically extending side rails;
a lumbar support system disposed in the seat back, the lumbar support system including:
a frame having a pair of extending members;
an upper bridge member operatively coupled to the extending members and movable there along;
a lower bridge member operatively coupled to the extending members below the upper bridge member and movable there along, the lower bridge member having a central portion and a pair of legs extending downwardly from the central potion; and
a pair of lumbar bands, a top end portion of each lumbar band being operatively coupled to the upper bridge member and a lower end portion of each lumbar band being operatively coupled to a leg of the lower bridge member, the legs of the lower bridge member extending below the lower cross member when the lower bridge member is in a lowermost position,
wherein the upper and lower bridge members may move along the extending members in unison to adjust a vertical position of the lumbar bands and may move along the extending members relative to one another to adjust a level of support provided by the lumbar bands.

18. The vehicle seat of claim 17, wherein the central portion of the lower bridge member is disposed above the lower cross member when the lower bridge member is in the lowermost position.

19. The vehicle seat of claim 18, wherein the lower end portions of the lumbar bands are operatively attached to a lower end portion of the legs and the lower end portions extend below the lower cross member when the lower bridge member is in the lowermost position.

20. The vehicle seat of claim 17, wherein the upper bridge member is generally U-shaped and includes a central portion and a pair of legs extending upwardly from the central portion and the upper end portions of the lumbar bands are operatively coupled to the legs of the upper bridge member and the lower bridge member is generally shaped as an inverted U.

* * * * *